July 22, 1958 M. MINKOW 2,844,721

SIGNAL GENERATOR ERROR DETECTOR

Filed Dec. 10, 1954 3 Sheets-Sheet 1

ERROR DETECTOR 20

INVENTOR.
MORSE MINKOW
BY S.C. Yuter
ATTORNEY.

SIGNAL GENERATOR ERROR DETECTOR

Filed Dec. 10, 1954 3 Sheets-Sheet 2

INVENTOR.
MORSE MINKOW

BY S.C. Yuter

ATTORNEY.

GATE 122

GATE 122

BUFFER 146

BUFFER 146

D-C AMPLIFIER 149 D-C AMPLIFIER 149

FLIP-FLOP 258

INVENTOR
MORSE MINKOW
BY S. E. Yuter
ATTORNEY

United States Patent Office 2,844,721

Patented July 22, 1958

2,844,721

SIGNAL GENERATOR ERROR DETECTOR

Morse Minkow, Bronx, N. Y., assignor to Underwood Corporation, New York, N. Y., a corporation of Delaware Application December 10, 1954, Serial No. 474,476

8 Claims. (Cl. 250—27)

This invention relates to error detecting equipment, and more particularly to apparatus which indicates improper operation of a signal generator by detecting errors in the generated signals.

Signal generators may produce erroneous signals because of improperly functioning components. In a signal generator which responds to a standard input signal to produce a sequence of timed output signals, errors may fall into several categories. One type of error occurs when the signal generator ceases to produce output signals. A second type of error occurs when undesirable signals are generated simultaneously with desired signals. A third type of error occurs when the signal generator generates output signals which are improperly timed.

It is desirable to know when an error occurs in a signal generator so that the operation of the signal generator can be checked and corrected.

It is accordingly an object of the invention to provide improved apparatus for indicating improper operation of signal generators.

Another object of the invention is to provide an improved error detector for checking the various types of errors which can occur in signals produced by a signal generator.

A further object of the invention is to provide an error detector which indicates when the signal generator stops producing output signals, when undesired signals are generated, or when the signal generator generates signals in improper time orientation.

Briefly, an error detector in accordance with the invention comprises apparatus for comparing certain of the signals produced by a signal generator with each other and apparatus for comparing signals generated by a signal generator with a standard signal. An error is indicated by an indicator if the signal generator is functioning improperly.

An advantage of error detecting apparatus designed in accordance with the invention is that such apparatus is both inexpensive and reliable. A further advantage of error detectors of the invention is that they can be readily incorporated into existing signal generators with the addition of very little additional equipment.

The invention will be more readily understood from the following description taken together with the accompanying drawings in which.

An error detector with the preferred embodiment of the invention will next be described in connection with a signal generator such as is described and claimed in the copending application of Albert A. Auerbach, Morse Minkow and Edmund D. Schreiner, Serial No. 471,696, filed November 29, 1954, and assigned to the same assignee.

The error detector will indicate when the signal generator stops producing output signals, when undesirable signals are being generated and when the signal generator is generating output signals which are improperly timed.

Figure 1:
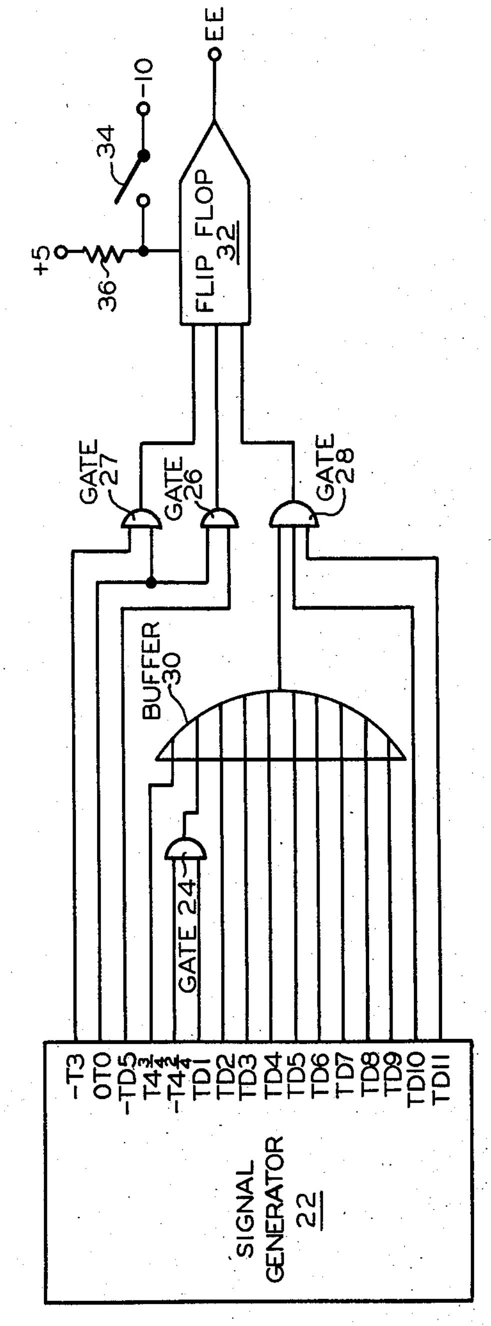
Fig. 1 is a block diagram (employing logical symbols) of an error detector used to monitor the output signals of a signal generator in accordance with the preferred embodiment of the invention.

Referring now to the apparatus illustrated in Fig. 1, an error detector 20 is shown. Error detector 20 functions with the signal generator 22 to indicate the errors enumerated above.

The error detector 20 comprises gates 24, 26, 27 and 28, a buffer 30, a flip flop 32, a switch 34 and a resistor 36.

The signal generator 22 (which is fully described in the copending application) generates signals which are checked by the error detector 20. The error detector 20 works in cooperation with the signal generator 22 and utilizes the same signal system. Therefore, the error detector 20 employs signals of two voltage levels only. These voltage levels are minus ten volts and plus five volts.

A gate of the error detector 20 is a crystal diode network which functions to receive input signals via a plurality of input terminals and to pass the most negative signal. Thus, if a minus ten volt signal is present at one or more of the terminals of a gate, the gate will transmit minus ten volts and positive signals present at any of the terminals are blocked. If, however, plus five volt signals are present at all of the input terminals of a gate, the gate will transmit plus five volts.

The buffer used in the error detector 20 is a crystal diode network which functions to receive input signals via input terminals and to pass the most positive signal. Thus, if a plus five volt signal is present at one or more of the input terminals of the buffer, the buffer will transmit plus five volts. If, however, minus ten volt signals are present at all of the input terminals of the buffer, the buffer will function to transmit minus ten volts.

The flip flop used in the error detector 20 is a bi-stable electronic circuit. If the flip flop is in a normal or "reset" state, the flip flop transmits minus ten volts via its output terminal. If the flip flop is in its excited or "set" state, the flip flop transmits plus five volts via its output terminal. The flip flop is set (put into its excited state) when a positive signal is received via an input terminal and the flip flop remains set until a negative signal is received via a reset terminal.

The gates, buffer and flip flop are hereinafter described in greater detail.

In the error detector 20, the flip flop 32 is normally in its reset state and transmits minus ten volts via the output terminal EE indicating that there is no error in the signals generated by the signal generator 22. However, the error detector 20 continually checks certain of the signals generated by the signal generator 22 against each other and against a standard signal (as will hereinafter be described in detail) and transmits plus five volts from terminal EE when an error is detected.

The terminals of the signal generator 22 which are coupled to the error detector 20 are as follows: TD1 to TD11, —TD5, —T3, —T4¾, T4¾ and OTO. The signal OTO which is utilized in the signal generator 22 to initiate the generation of an output pulse is used as a standard signal in the error detector 20. The output pulse caused by OTO initiates the sequences of output pulses generated by the signal generator 22.

Terminals TD1 and —T4¾ are coupled to the input terminals of the gate 24 whose output terminal is coupled to an input terminal of the buffer 30. Terminals TD2 to TD9 and T4¾ are also connected to input terminals of the buffer 30. The output terminal of the buffer 30 and terminals TD10 and TD11 are connected to input terminals of the gate 28. The output terminal of the gate 28 is connected to an input terminal of the flip flop 32.

The gate 26 couples the terminal —TD5 to another input terminal of the flip flop 32. The standard signal OTO is fed to a second input terminal of the gate 26. The gate 27 couples OTO and terminal —T3 to a third input terminal of flip flop 32.

The reset terminal of the flip flop 32 is connected via resistor 36 to a plus five volts supply. The switch 34 (shown in open position) is coupled to a minus ten volts supply. When the switch 34 is closed minus ten volts is supplied to the reset terminal of flip flop 32 to reset the flip flop 32. When the switch 34 is open, plus five volts is present at the reset terminal of the flip flop 32 and the flip flop 32 can be set.

Figure 2:
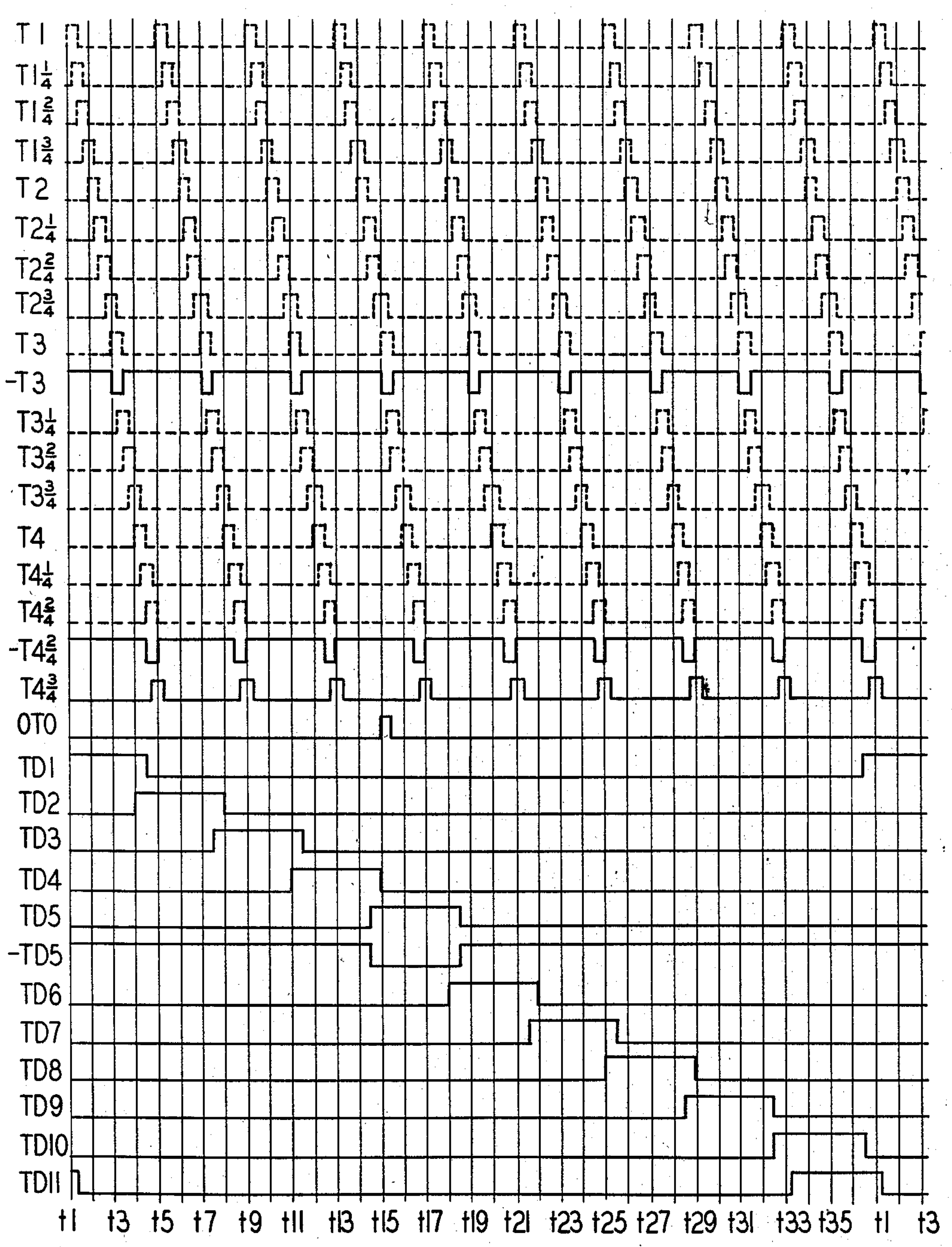
Fig. 2 is a time chart of signals (somewhat idealized) which are used by the error detector of Fig. 1.

Referring now to the time chart shown in Fig. 2, the signals which are generated by the signal generator 22 are graphically illustrated. The solid lines illustrate the signals generated by the signal generator 22 which are utilized by the error detector 20. It will be noted that the abscissa of the chart is measured in time units which encompass the time periods *t*1 through *t*36 and constitute a timing cycle. The pulse patterns illustrated in the time chart are repetitive from timing cycle to timing cycle. OTO, the standard signal, is a pulse occurring at *t*15.

Referring now to Figs. 1 and 2 it will be shown how the error detector 20 checks for the various types of errors which can occur in the signal generator 22.

The signal generator 22 generates two series of signals and since three types of errors have been enumerated for signal generators, six different errors can occur in the signal generator 22.

More particularly the signal generator 22 generates the signals T and TD. It is therefore possible for the TD signals to be absent from the signal generator 22, for extra TD signals to be generated by the signal generator 22 and for the TD signals which are generated by the signal generator 22 to be improperly timed. Further, it is possible for the T signals to be absent from the signal generator 22, for the signal generator 22 to generate extra T signals, and for the T signals of the signal generator 22 to be improperly timed.

It will next be shown how the error detector can indicate the occurrence of any of the six errors by checking certain of the signals of the signal generator 22 against each other and against the standard signal OTO.

The signal —TD5 is normally positive and becomes negative during the time period *t*14¾–*t*18¾ (the period during which TD5 is generated). If the TD signals are absent from the signal generator 22, the signal —TD5 will not become negative during the indicated period and will remain positive during the entire timing cycle.

The period during which —TD5 becomes negative is the period during which the signal OTO occurs. Hence if the signal generator 22 is functioning properly and the TD signals are being generated, —TD5 will cause OTO to be blocked at gate 26 and the gate 26 will transmit minus ten volts to the flip flop 32 which will remain in its reset condition.

If, however, the signal generator 22 is not functioning properly such that TD signals are absent, —TD5 will remain at plus five volts during the entire timing cycle. Thus when OTO occurs at the gate 26, plus five volts will be fed via the gate 26 to the input terminal of the flip flop 32.

The flip flop 32 is set when it receives a positive signal from the gate 26 and transmits plus five volts from its output terminal EE. Thus the flip flop 32 functions to indicate that the TD signals are absent in the signal generator 22.

It has already been noted that the TD signals TD2–TD9 are fed to input terminals of the buffer 30 and that the output terminal of the gate 24 is coupled to an input terminal of the buffer 30.

In respect to gate 24, —T4¾ is negative from *t*36¾ to *t*1 during the occurrence of TD1. Therefore the gate 24 transmits a positive signal to the buffer 30 from *t* to *t*4¾ during each timing cycle. The buffer 30 passes each of the other enumerated TD pulses to the gate 28 as each of the TD pulses occurs.

Other signals fed to input terminals of the gate 28 are the signals TD10 and TD11. It will be noted on the time chart of Fig. 2 that the pulses TD10 and TD11 overlap (are simultaneously positive) during *t*33¼ to 36¾ of each timing cycle. It will further be noted from the time chart, that when the signal generator 22 is functioning properly no other TD signal exists during the period of the overlap of TD10 and TD11 (the gate 24 deletes the portion of TD1 which coincides with the overlap as previously shown). Thus, when the input terminals of gate 28 which are coupled to TD10 and TD11 are simultaneously positive and the signal generator 22 is properly generating the sequence of TD pulses, the buffer 30 transmits a negative signal via the gate 28 to the input terminal of the flip flop 32 which remains in its normal condition.

If, however, an extra sequence of TD pulses are improperly generated, one of the pulses of the improper sequence must coexist with the overlapping period of TD10 and TD11.

The buffer 30 will thus transmit a positive signal to the gate 28 when TD10 and TD11 are simultaneously positive and the gate 28 will pass a positive signal to the flip flop 32 which is thereby set. The flip flop 32 then transmits a positive signal via the output terminal EE and indicates that an error exists in the signal generator 22.

Since the TD pulses are regenerative (i. e., each TD pulse initiates the next TD pulse in the sequence), it is highly improbable that an extra TD pulse can be generated by the signal generator 22 without initiating an extra sequence of TD pulses. Therefore, since the error detector 20 indicates when an extra sequence of TD pulses is being generated, the error detector 20 indicates the existence of extra TD pulses with a high degree of accuracy.

The third error which has been enumerated consists of the TD pulses being improperly timed.

It has already been shown that the transmission of —TD5 to the gate 26 normally prevents OTO from being passed to the input terminal of the flip flop 32. If, however, the TD pulses are improperly timed —TD5 will be shifted in time and will not become negative during the occurrence of OTO. OTO will therefore be transmitted via gate 26 to flip flop 32. The flip flop 32 is set and transmits a positive signal to the terminal EE to indicate that an error has occurred.

The remainder of the enumerated errors pertain to the T signals. The T pulses may be absent in the signal generator 22, the signal generator 22 may generate extra T pulses and the T pulses may be in improperly timed orientation.

If the T pulses are absent in the signal generator 22, the TD pulses will also be absent since the T pulses cooperate in the initiation of TD pulses. The error detector 20 will indicate the absence of the TD pulses in a manner previously described and will indicate that an error has occurred by transmitting a positive signal from the output terminal EE of flip flop 32.

If extra T pulses are generated, the error detector 20 will again indicate an error. T4¾ is fed via the buffer 30 to the gate 28. It is seen on the timing chart of Fig. 2 that only T4¾ occurs during a timing cycle without co-existing in any part with the period of overlap of TD10 and TD11. (T4¾ exists in part during the overlap of TD10 and TD11 since TD10 is terminated by —T4¾ and by an N pulse as shown in the copending application.) If an extra T pulse is generated, an extra T4¾ results and is displaced in time from the desired T4¾ pulse. The extra T4¾ pulse must occur during the period of overlap of TD10 and TD11 and will pass through the gate 28 to set the flip flop 32. A positive signal will thus be transmitted from output terminal EE to indicate an error.

The final enumerated error consists of the T pulses being improperly timed. OTO and —T3 are fed to gate 27. Normally —T3 is negative when OTO occurs and OTO is blocked at gate 27. If, however, the T pulses are improperly timed, —T3 remains positive when OTO occurs and a positive signal is transmitted to flip flop 32. The flip flop 32 is thereby set and an error is indicated.

It has been shown how the error detector 20 indicates an error if the T or TD pulses are absent from or generated improperly by the signal generator 22. Thus an error detector has been illustrated which checks for all errors which are most likely to occur in the signal generator 22. The error detector of the invention is very well adapted for use in data processing apparatus which relies upon timing signals which must be precisely generated. The logical symbols which were used to illustrate the error checker 20 are next described in detail.

*Description of symbols*

The schematic equivalents of the symbols which have been employed to simplify the detailed description of the error detector 20 are shown in Figs. 3 through 10. For convenient reference, all positive and negative supply buses will generally be identified with a number corresponding with their voltage. The schematic terminals which correspond to symbol terminals are identified by the same character reference numbers as are used for the symbols.

*Gate*

The gates used in the apparatus are of the "coincidence" type, each comprising a crystal diode network which functions to receive input signals via a plurality of input terminals and to pass the most negative signal.

Figure 3:
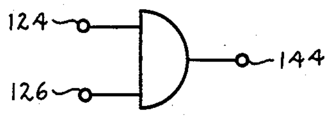
Fig. 3 shows the symbol for a gate.

The symbol for a representative gate 122, having two input terminals 124 and 126, is shown in Fig. 3. Since the signal potential levels are plus five volts (positive signals) and minus ten volts (negative signals), the potentials of the signals which may exist at the input terminals 124 and 126 are thereby limited.

If a potential of minus ten volts is present at one or both of the input terminals 124 and 126, a potential of minus ten volts exists at the output terminal 144. Therefore, if one of the input signals to the input terminals 124 and 126 is positive and the other signal is negative, the negative signal is passed and the positive signal is "blocked."

When there is a coincidence of positive signals at the two input terminals 124 and 126, a positive signal is transmitted from the output terminal 144. In such case, it may be stated that a positive signal is "gated" or "passed" by the gate 122.

Figure 4:
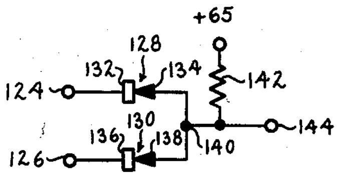
Fig. 4 is a schematic diagram of the circuit represented by the symbol of Fig. 3.

The schematic details of the gate 122 are shown in Fig. 4. Gate 122 includes the crystal diodes 128 and 130. Each of the input terminals 124 and 126 is coupled to one of the crystal diodes 128 and 130. Crystal diode 128 comprises the cathode 132 and the anode 134. Crystal diode 130 comprises the anode 138 and the cathode 136. More particularly, the input terminals 124 and 126 are respectively coupled to the cathode 132 of the crystal diode 128 and the cathode 136 of the crystal diode 130. The anode 134 of the crystal diode 128 and the anode 138 of the crystal diode 130 are interconnected at the junction 140. The anodes 134 and 138 are coupled via the resistor 142 to the positive voltage bus 65.

If negative potentials are simultaneously present at the input terminals 124 and 126, both of the crystal diodes 128 and 130 conduct, since the positive supply bus 65 tends to make the anodes 134 and 138 more positive. The voltage at the junction 140 will then be minus ten volts since, while conducting, the anodes 134 and 138 of the crystal diodes 128 and 130 assume the potential of the associated cathodes 132 and 136.

When a positive signal is fed only to the input terminal 124, the cathode 132 is raised to a positive five volts potential and is made more positive than the anode 134, so that crystal diode 128 stops conducting. As a result, the potential at the junction 140 remains at the negative ten volts level. In a similar manner, when a positive signal is only present at the input terminal 126, the voltage at the junction 140 will not be changed.

When the signals present at both input terminals 124 and 126 are positive, the anodes 134 and 138 are raised to approximately the same potential as their associated cathodes 132 and 136 and the potential at the junction 140 rises to a positive potential of five volts.

The potential which exists at the junction 140 is transmitted from the gate 122 via the connected output terminal 144.

In the above described manner, the gate 122 is frequently used as a switch to govern the passage of one signal by the presence of one or more signals which control the operation of the gate 122. It should be understood that two input terminals are shown by way of example and that additional input terminals are added by increasing the number of input crystal diodes connected to the junction 140.

It should be further understood that the potentials of plus five volts and minus ten volts used for purpose of illustration are approximate, and the exact potentials will be affected in two ways. First, they will be affected by the value of the resistance 142 and its relation to the impedances of the input circuits connected to the input terminals 124 and 126. Second, they will be affected by the fact that a crystal diode has some resistance (i. e., is not a perfect conductor) when its anode is more positive than its cathode, and furthermore will pass some current (i. e., does not have infinite resistance) when its anode is more negative than its cathode. Nevertheless, the assumption that signal potentials are either plus five or minus ten volts is sufficiently accurate to serve as a basis for the description of the operations taking place in the apparatus.

A clamping diode may be connected to the output terminal 144 to prevent the terminal from becoming more negative than a predetermined voltage level to protect the diodes 128 and 130 against excessive back voltages and to provide the proper voltage levels for succeeding circuits.

*Buffer*

The buffers used in the comparators are also known as "or" gates. Each buffer comprises a crystal diode network which functions to receive input signals via a plurality of input terminals and to pass the most positive signal.

Figure 5:
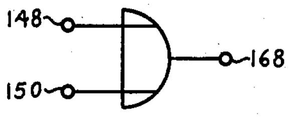
Fig. 5 illustrates the symbol for a buffer.

The symbol for a representative buffer 146, having two input terminals 148 and 150, is shown in Fig. 5. Since the signal potential levels in the system are minus ten volts and plus five volts, either one of these potentials may exist at the input terminals 148 and 150.

If a positive potential of five volts exists at one or both of the input terminals 148 or 150, a positive potential of five volts exists at the output terminal 168. If a negative potential of ten volts is present at both of the input terminals 148 and 150, a negative potential of ten volts will be present at the output terminal 168.

Figure 6:
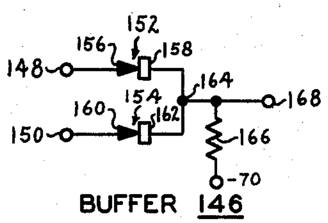
Fig. 6 is a schematic diagram of the circuit represented by the symbol of Fig. 5.

The schematic details of the buffer 146 are shown in Fig. 6. The buffer 146 includes the two crystal diodes 152 and 154. The crystal diode 152 comprises the anode 156 and the cathode 158. Crystal diode 154 comprises the anode 160 and the cathode 162. The anode 156 of the crystal diode 152 is coupled to the input terminal 148. The anode 160 of the crystal diode 154 is coupled to the input terminal 150. The cathodes 158 and 162 of the crystal diodes 152 and 154, respectively, are joined at the junction 164 which is coupled to the output terminal 168, and via the resistor 166 to the negative supply bus 70. The negative supply bus 70 tends to make the cathodes 158 and 162 more negative than the anodes 156 and 160, respectively, causing both crystal diodes 152 and 154 to conduct.

When negative ten volt signals are simultaneously present at input terminals 148 and 150, the crystal diodes 152 and 154 are conductive, and the potential at the cathodes 158 and 162 approaches the magnitude of the potential at the anodes 156 and 160. As a result, a negative potential of ten volts appears at the output terminal 168.

If the potential at one of the input terminals 148 or 150 increases to plus five volts, the potential at the junction 164 approaches the positive five volts level as this voltage is passed through the conducting crystal diode 152 or 154 to which the voltage is applied. The other crystal diode 152 or 154 stops conducting since its anode 156 or 160 becomes more negative than the junction 164. As a result, a positive potential of five volts appears at the output terminal 168.

If positive five volt signals are fed simultaneously to both input terminals 148 and 150, a positive potential of five volts appears at the output terminal 168, since both crystal diodes 152 and 154 will remain conducting. Thus the buffer 146 functions to pass the most positive signal received via the input terminals 148 and 150.

It should be understood that two input terminals are shown by way of example only and that additional input terminals are supplied by increasing the number of input crystal diodes connected to the junction 164.

*D.-C. amplifier*

Figures 7, 8:
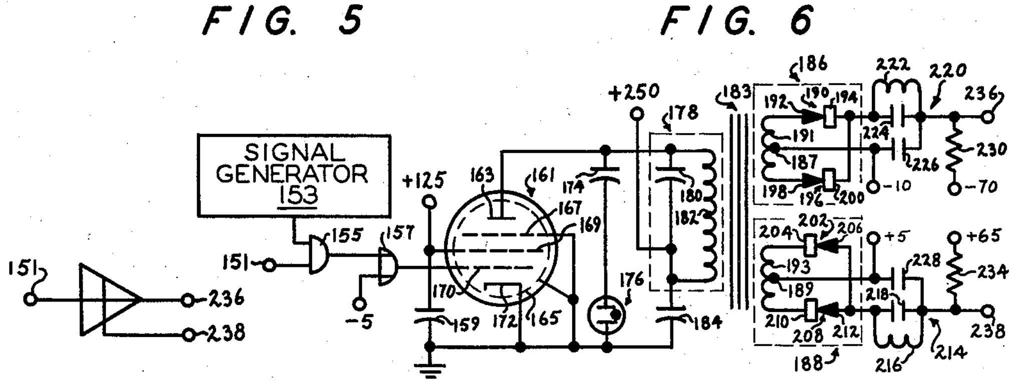
Fig. 7 shows the symbol for a D.-C. amplifier.
Fig. 8 is a schematic diagram of the circuit represented by the symbol of Fig. 7.

The symbol for a representative D.-C. amplifier 149 as hereinafter used in the flip flop is shown in Fig. 7. When a positive signal is present at the input terminal 151, a positive signal of five volts appears at the positive output terminal 236 and a negative signal of ten volts is present at the negative output terminal 238. If a negative potential is present at the input terminal 151, the potentials at the output terminals 236 and 238 are reversed.

As shown in Fig. 8, the D.-C. amplifier 149 includes the gate 155, the buffer 157, the vacuum tube 161, the transformer 183, the full-wave rectifiers 186 and 188, and the filters 220 and 214.

The input terminal 151 is connected to one input terminal of the gate 155. The other input of the gate 155 is fed a one megacycle carrier signal from the signal generator 153 which is a signal generator of known type. The megacycle carrier signal swings from minus ten to plus five volts.

One input of the buffer 157 is connected to the output of the gate 155. The other input of the buffer 157 is connected to the negative supply bus 5. The buffer 157 couples the output of the gate 155 to the control grid 170 of the vacuum tube 161.

The vacuum tube 161 is a five element tube having a grounded cylindrical shield 165, and includes the anode 163 connected via the primary winding 182 of the transformer 183 to a positive supply bus 250. The junction of the positive supply bus 250 and the primary winding 182 is coupled via the capacitor 184 to ground. The vacuum tube 161 also includes the suppressor grid 167 which is connected to ground, the screen grid 169 which is connected to the positive supply bus 125 and via the capacitor 159 to ground, and the cathode 172 which is grounded.

The anode 163 of the vacuum tube 161 is also connected via the coupling capacitor 174 to the neon tube 176 which is grounded. The capacitor 180 is connected in parallel with the primary winding 182 of the transformer 183 to form the parallel tank circuit 178 which is tuned to the frequency of the carrier signal.

The full-wave rectifier 186 is connected to the secondary winding 191 having its center tap 187 connected to the negative supply bus 10. The full-wave rectifier 186 includes the pair of crystal diodes 190 and 196. The anodes 192 and 198 of the crystal diodes 190 and 196 are respectively coupled to opposite ends of the secondary winding 191 of the transformer 183, and the cathodes 194 and 200 of the crystal diodes 190 and 196 are interconnected.

The full-wave rectifier 188 is connected to the secondary winding 193 having its center tap 189 connected to the positive supply bus 5.

The full-wave rectifier 188 includes the pair of crystal diodes 202 and 208. The cathodes 204 and 210 of the crystal diodes 202 and 208 are coupled to opposite ends of the secondary winding 193, and the anodes 206 and 212 of the crystal diodes 202 and 208 are connected together.

The filter 220 which couples the cathodes 194 and 200 of the crystal diodes 190 and 196 to the positive output terminal 236 is a parallel tank circuit which includes the capacitor 224 and the inductor 222. The capacitor 226 connects the positive output terminal 236 to the negative supply bus 10. The positive output terminal 236 is also coupled via the resistor 230 to the negative supply bus 70.

The filter 214, which couples the anodes 206 and 212 of the crystal diodes 202 and 208 to the negative output terminal 238, is a parallel tank circuit which includes the capacitor 218 and the inductor 216. The capacitor 228 connects the negative output terminal 238 to the positive supply bus 5. The negative output terminal 238 is also coupled by the resistor 234 to the positive supply bus 65.

Initially, the crystal diodes 190 and 196 are in a conductive state such that the potential at the positive output terminal 236 is approximately minus ten volts. Similarly, the crystal diodes 202 and 208 are initially in a conductive state such that the potential at the negative output terminal 238 is approximately plus five volts.

When a signal is fed to the input terminal 151 it is combined in gate 155 with the one megacycle carried and fed to the buffer 157. As previously noted, one input terminal of the buffer 157 is connected to a negative five volts supply bus so that all signals at the output of gate 155 which are equal to or more positive than minus five volts will be passed by the buffer 157. A signal passed by the buffer 157 is applied to the control grid 170 of the vacuum tube 161. The signal is amplified by vacuum tube 161 and appears across the parallel tank circuit 178. The parallel tank circuit 178 is tuned to the frequency of the incoming signal so that the maximum signal will be passed by the parallel tank circuit 178 to the full-wave rectifiers 186 and 188.

The full-wave rectifier 186 delivers a positive signal which is then filtered by the filter 220 to appear as a positive direct-current potential of approximately five volts at the positive output terminal 236. The full-wave rectifier 188 delivers a negative signal which is then filtered by the filter 214 to appear as a negative direct-current potential of approximately ten volts at the negative output terminal 238.

Thus, if a positive signal is present at the input terminal 151, the voltage at the positive output terminal 236 is plus five volts, and the potential at the negative output terminal 238 is minus ten volts. However, if no signal is present at the input terminal 151, the voltage at the positive output terminal 236 will be minus ten volts, and the potential at the negative output terminal 238 will be plus five volts.

Generally, it should be noted that this D.-C. amplifier is a carrier type D.-C. amplifier with positive and negative output signals comprising only one vacuum tube and producing output signals equal in magnitude to the input signals. It should also be noted that the D.-C. amplifier includes a transformer and rectifiers for producing output signals of the desired magnitude from a low impedance source, the D.-C. amplifier thereby being especially adaptable for use in conjunction with networks of crystal diodes.

*Flip flop*

A flip flop of the type used in the apparatus is a bi-stable electronic circuit with an output terminal which is maintained at one potential level to indicate one stable state. Upon the receipt of a positive input signal, the potential level of the output terminal is changed to indicate a second stable state.

Figure 9:
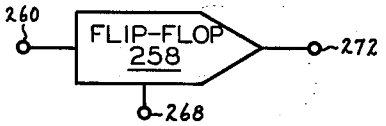
Fig. 9 illustrates the symbol for a flip flop.

The symbol for a representative flip flop 258 is illustrated in Fig. 9. The flip flop 258 comprises the input terminal 260, the reset terminal 268, and the output terminal 272.

One stable state of the flip flop 258 is the normal condition which is designated "reset" and exists when a negative potential of ten volts appears at the output terminal 272. The other stable state is designated "set" and exists when a positive potential of five volts appears at the output terminal 272.

The flip flop 258 is set when a positive signal is received via its input terminal 260, and a positive signal is present at its reset terminal 268. Therefore, the flip flop 258 will not be set if a reset (negative) signal is present at the reset terminal 268.

Once set, the flip flop 258 remains set as long as a positive signal is received via the reset terminal 268 even though the "setting" signal has terminated. When the signal at the reset terminal 268 becomes negative, the flip flop 258 is reset.

Figure 10:
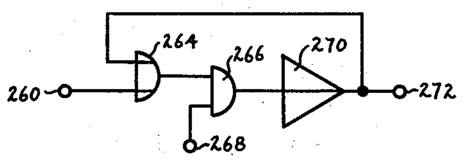
Fig. 10 is a logical diagram of the circuit represented by the symbol of Fig. 9.

The detailed circuitry of the flip flop 258 is illustrated in Figure 10 in which use is made of logical symbols previously described.

The flip flop 258 comprises the buffer 264, the gate 266 and the D.-C. amplifier 270 connected in series. The input terminal 260 is the input terminal of the buffer 264.

The buffer 264 is coupled to the gate 266. The reset terminal 268 is also coupled to the gate 266. When the gate 266 receives positive signals coincidentally from the buffer 264 and the reset terminal 268, the gate 266 passes a positive signal to the D.-C. amplifier 270, and causes the D.-C. amplifier 270 to generate a positive potential of five volts at its output terminal 272.

The output terminal 272 is coupled directly to the buffer 264 so that when a positive signal is generated at the output terminal 272, the signal is regenerative. The positive signal will be maintained at the output terminal 272 until the gate 266 is blocked by a negative signal received via the reset terminal 268.

There will now be obvious to those skilled in the art many modifications and variations utilizing the principles set forth and realizing many or all of the objects of the circuits described but which do not depart essentially from the spirit of the invention.

What is claimed is:

1. Error checking apparatus for checking errors in a signal generator which responds to a standard signal by generating a plurality of signals which are time oriented comprising first means for checking certain of the signals against other of the signals during a period of time when said certain of the signals are normally absent, second means for checking certain of the signals which normally occur simultaneously with the standard signal against the standard signal and an indicating means settable by either said first or said second means for indicating when no signals are being generated by said signal generator, when extra signals are being generated by said signal generator or when signals are incorrectly time oriented.

2. Error checking apparatus for checking errors in a signal generator which responds to a standard signal by generating a number of signals which are time oriented in respect to the standard signal comprising first means for detecting when more than said number of signals are being generated by said signal generator in a predetermined period of time, second means for detecting when signals are incorrectly time oriented in respect to the standard signal, and indicating means responsive to said first and second means for indicating an error in said signal generator.

3. In combination with a signal generator which supplies a standard pulse and first and second series of pulses, an error checker comprising a bi-stable device for indicating errors in the first and second series of pulses, a first gate coupling said signal generator to said bi-stable device, said first gate being responsive to certain of the first series of pulses for detecting when more than the normal number of first and second series of pulses are generated by said signal generator in a predetermined period of time, a second gate responsive to the standard pulse and certain of the first series of pulses for detecting when the first and second series of pulses are not being generated by said signal generator and when said first series of pulses are improperly timed, and a third gate responsive to the standard pulse and certain of said second series of pulses for detecting when said second series of pulses are improperly timed, said bi-stable device being responsive to said first, second and third gates for indicating an error.

4. Error checking apparatus for checking errors in a signal generator which generates first and second groups of signals having predetermined timing relationships comprising sensing means for sensing for the occurrence of one of said signals of said group of signals during a predetermined period of time when said one of said signals is normally absent, said predetermined period of time corresponding to the signal recurrence time of one of said second group of signals, said sensing means also sensing for the presence of signals of said second group of signals during said predetermined period of time in which said signals of said second group of signals are normally absent, and indicating means responsive to a signal sensed by said sensing means for indicating the occurrence of an error.

5. Error checking apparatus for checking errors in a signal generator which generates first and second groups of signals having predetermined timing relationships comprising sensing means for sensing for the occurrence of one of said signals of said first group of signals during a predetermined period of time when said one of said signals is normally absent, said predetermined period of time corresponding to the signal recurrence time of said first group of signals diminished by the duration time of one of said signals of said first group of signals, said sensing means also sensing for the presence of signals of said second group of signals during said predetermined period of time in which said signals of said second group of signals are normally absent, and indicating means responsive to a signal sensed by said sensing means for indicating the occurrence of an error.

6. Error checking apparatus for checking errors in a signal generator which generates first and second groups of signals having predetermined timing relationships comprising sensing means for sensing for the occurrence of one of said signals of said first group of signals during a predetermined period of time when said one of said signals is normally absent, said predetermined period of time being the duration time of one of said second group of signals diminished by one and one half times the duration time of one of said signals of said first group of signals, said predetermined period of time being determined by the overlapping period of two of said signals of said second group of signals, said sensing means also sensing for the presence of signals of said second group of signals during said predetermined period of time in which said signals of said second group of signals are normally absent, and indicating means responsive to a signal sensed by said sensing means for indicating the occurrence of an error.

7. Error checking apparatus for checking errors in a signal generator which in response to a standard signal generates first and second groups of signals having predetermined timing relationships comprising first sensing means for sensing the simultaneous presence of said standard signal and predetermined signals of said first and second groups of signals, said predetermined signals normally being present when said standard signal occurs, second sensing means for sensing for the presence of signals of said second group of signals during a predetermined period of time in which said signals of said second group of signals are normally absent, said second means also sensing for the occurrence of one of said signals of said first group of signals during said predetermined period of time, said first sensing means sensing the absence of said first or second group of signals and the incorrect timing of said first or second groups of signals, said second sensing means sensing the occurrence of undesired signals, and indicating means responsive to said first and second sensing means for indicating the occurrence of an error.

8. Error checking apparatus for checking errors in a signal generator which in response to a standard signal generates first and second groups of signals having predetermined timing relationships comprising first sensing mean for sensing the simultaneous presence of said standard signal and predeterminal signals of said first and second groups of signals, said predetermined signals normally being present when said standard signal occurs, second sensing means for sensing for the presence of signals of said second group of signals during a predetermined period of time in which said signals of said second group of signals are normally absent, said second means also sensing for the occurrence of one of said signals of said first group of signals during said predetermined period of time, said predetermined period of time corresponding to the signal recurrence time of said first group of signals diminished by the duration time of one of said signals of said first group of signals, said first sensing means sensing the absence of said first or second group of signals and the incorrect timing of said first or second group of signals, said second sensing means sensing the occurrence of undesired signals, and indicating means responsive to said first and second sensing means for indicating the occurrence of an error.

References Cited in the file of this patent

UNITED STATES PATENTS

| | | |
|---|---|---|
| 2,538,027 | Mozley et al. | Jan. 16, 1951 |
| 2,540,167 | Houghton | Feb. 6, 1951 |
| 2,563,879 | Soukaras | Aug. 14, 1951 |
| 2,649,543 | Trachtenberg | Aug. 18, 1953 |
| 2,674,727 | Spielberg | Aug. 6, 1954 |
| 2,715,679 | Kleissl | Aug. 16, 1955 |
| 2,789,267 | Beal et al. | Apr. 16, 1957 |